United States Patent [19]

Jansen

[11] 4,047,589
[45] Sept. 13, 1977

[54] METHOD AND APPARATUS FOR CLOSED LOOP ACCELERATION CONTROL FOR VEHICLES

[75] Inventor: Harvey B. Jansen, Tempe, Ariz.

[73] Assignee: The Garrett Corporation, Los Angeles, Calif.

[21] Appl. No.: 668,154

[22] Filed: Mar. 18, 1976

[51] Int. Cl.² ............................................. B60K 26/00
[52] U.S. Cl. .................................... 180/108; 74/868; 74/856; 180/77 R
[58] Field of Search .............. 180/105 R, 108, 103 R, 180/70 R, 71, 77 R; 74/856, 861, 862, 865, 866, 867, 868

[56] References Cited

U.S. PATENT DOCUMENTS

| 3,292,449 | 12/1966 | Lewis | 74/865 |
| 3,876,028 | 4/1975 | Asano | 74/866 |
| 3,913,418 | 10/1975 | Miyao | 74/856 |

FOREIGN PATENT DOCUMENTS

| 956,311 | 1/1957 | Germany | 74/865 |
| 1,162,206 | 1/1964 | Germany | 74/865 |

Primary Examiner—John P. Silverstrim
Attorney, Agent, or Firm—Herschel C. Omohundro; James W. McFarland; Albert J. Miller

[57] ABSTRACT

The subject control applies to a vehicle having an engine with a throttle, a variable speed transmission, an axle with a housing, and drive wheels, there being a power responsive actuator for the transmission to change the power or speed ratio. The control includes method and apparatus for governing the application of power to the actuator, such method and apparatus being responsive to a combination of input signals from the throttle and a transmission output speed modified in accordance with thrust developed by the drive wheels and sensed by a device having a flex member connected with the frame of the vehicle and the drive wheel axle housing.

13 Claims, 3 Drawing Figures

METHOD AND APPARATUS FOR CLOSED LOOP ACCELERATION CONTROL FOR VEHICLES

BACKGROUND OF THE INVENTION

This invention resulted from attempts to adapt a single shaft gas turbine engine to a motor vehicle and to secure maximum fuel economy with an automatically operated transmission. In order to achieve the desired results it is proposed to select the optimum transmission gear ratio by using an actuating mechanism responsive to a combination of signals from the engine throttle and the transmission output speed modified in accordance with drive wheel thrust sensed in a novel manner.

SUMMARY

This invention relates generally to automatic controls and is more specifically directed to an acceleration control for vehicles. Still more particularly the invention relates to method and apparatus for a closed loop acceleration control which functions to select the optimum gear ratio for minimum acceleration time. An object of this invention is to provide method and apparatus for controlling acceleration of the vehicle having a variable speed transmission by adjusting the speed ratio of the transmission in relation to the throttle position, transmission output speed, and drive wheel thrust of the vehicle.

An object of this invention is to provide a combination of elements arranged to actuate a gear ratio selector in accordance with signals supplied by the engine accelerator, the transmission output speed, and the thrust developed by the vehicle drive wheels.

Another object of the invention is to provide an acceleration control for vehicles having a novel means for sensing the thrust load on the vehicle drive wheels and modifying the actuating signals applied to a part of the control mechanism in accordance therewith.

A further object of the invention is to provide a power responsive transmission ratio selector with a control mechanism which utilizes signals from the engine throttle and transmission output speed modified by drive wheel thrust sensed by simple flexible bar elements connected to the vehicle frame and axle housing.

A still further object of the invention is to make the transmission gear ratio selector, mentioned in the preceding paragraph, responsive to fluid pressure and form the control mechanism with a valve element moved in response to throttle actuation and transmission output speed and modify such movement in accordance with drive wheel thrust sensed by one or more bars fixed to the vehicle frame in cantilever fashion and connected with the drive wheels through the axle housing.

Another object of the invention is to provide an acceleration control mechanism of the character mentioned in the preceding paragraphs which will change the gear ratio in accordance with the thrust of the drive wheels, an increase in thrust causing a shift to a lower gear or increase in power and vice versa. In this manner a minimum vehicle acceleration time and consequent maximum efficiency will result.

Other objects and advantages will be pointed out or become obvious from a perusal of the following description of one form of the invention which has been selected for illustration in the accompanying drawing.

IN THE DRAWING

DESCRIPTION OF THE DISCLOSURE

Figure 1:
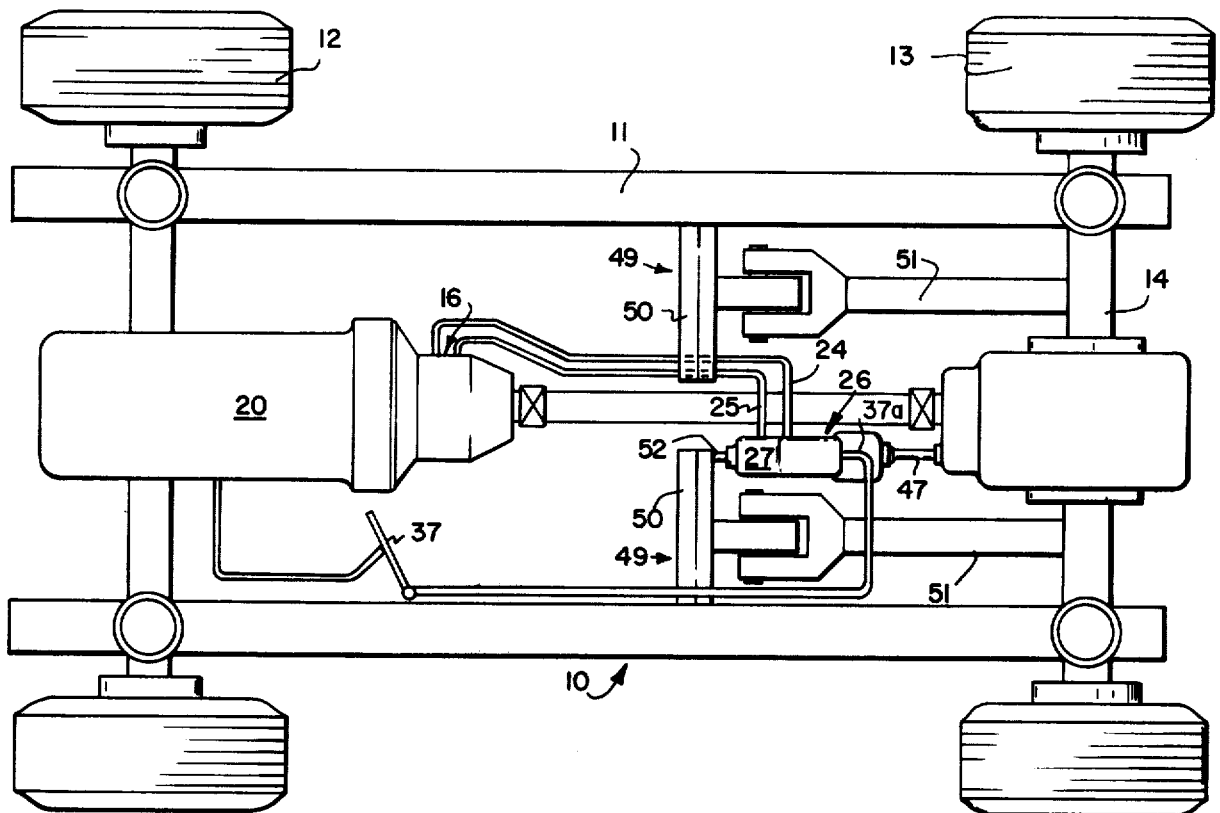
FIG. 1 is a schematic plan view of a vehicle chassis provided with an engine and an acceleration control system formed in accordance with the present invention.
Figure 3:
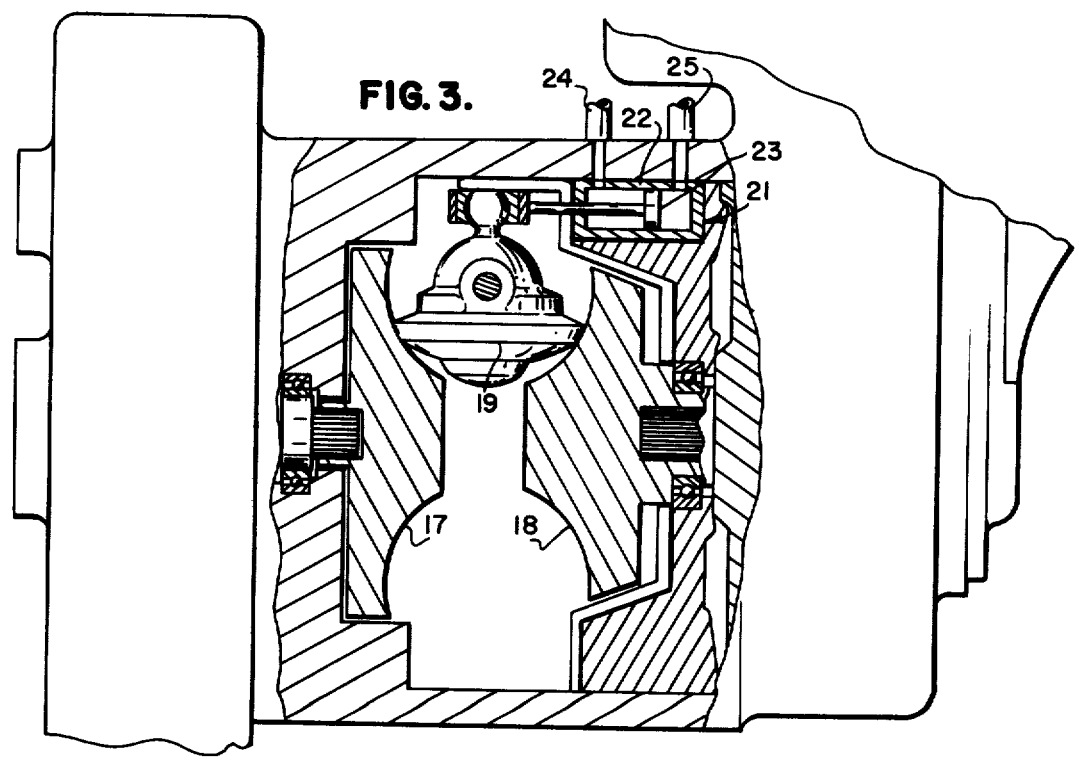
FIG. 3 is a sectional view of one form of variable ratio transmission which may be used in a vehicle provided with the acceleration control system of the invention.

More particular reference to the drawings and especially FIG. 1, will show that the invention is applicable to a vehicle 10 having a chassis 11 with wheels 12 and 13, the latter being driving wheels connected with an axle enclosed within a housing 14. Intermediate its ends, the housing includes a differential to which a drive shaft extends from a variable ratio transmission 16. This unit may be of many kinds, the one selected for illustration only being a traction type transmission having spaced curved driving and driven disks 17 and 18 with a transfer or idler roller 19 mounted for rotary and pivotal movement therebetween, the periphery of the roller engaging the surfaces of disks 17 and 18 and transferring rotary motion and torque from one to the other and eventually from the engine 20 to the drive wheels 13. Pivotal movement of roller 19 between the disks 17 and 18 varies the gear ratio of the transmission as is well known in the art. To effect such pivotal movement, the transmission 16 is provided with a power unit 21 consisting of a cylinder 22 and piston 23 movable therein response to the application of fluid pressure to either end of the cylinder 22 through lines 24 and 25. Fluid pressure may be secured from any suitable source. It will be obvious from the description thus far, taken in connection with FIG. 3, that as the roller 19 is moved on its pivot between the disks 17 and 18 the gear ratio will be changed to vary the speed of rotation and the power transmitted to the drive wheels.

When the vehicle moves from a standing condition the power required is greater than that needed to maintain motion, therefore, a gear ratio which will permit a high rate of engine rotation with maximum power delivered to the wheels is selected. As the vehicle accelerates the gear ratio is changed whereby power to the wheels is decreased and rotary speed of the wheels is increased. This function is automatically secured with the control mechanism of of the invention which mechanism has been designated generally by the numeral 26 in FIG. 1.

Figure 2:
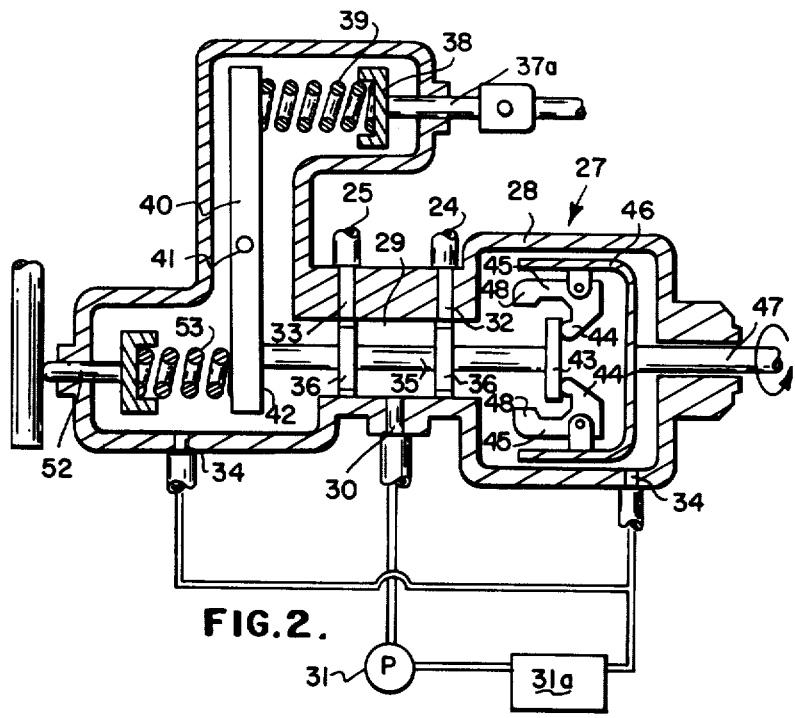
FIG. 2 is a sectional view of a part of the control mechanism used in the system of FIG. 1 to govern the flow of power to the transmission ratio selecting apparatus.

Control mechanism 26 (see FIG. 2) includes a unit 27 having a casing 28 forming a valve cylinder 29 with an inlet 30, for fluid under pressure from a suitable source 31, and spaced power cylinder ports 32 and 33. Ports 32 and 33 are suitably connected by the lines 24 and 25, respectively, with the ends of cylinder 22 on the transmission power unit 21. Casing 28 is also formed with ports 34 from which fluid is discharged from the transmission power unit to a suitable sump 31a.

Valve cylinder 29 receives a valve spool 35 which has spaced heads 36 thereon arranged to control communication between the fluid inlet port 30 and cylinder ports 32 and 33 and between the latter and sump ports 34 depending upon the position of valve spool 35.

Spool 35 is moved by a combination of forces applied in response to a plurality of input signals. As suggested above one input signal is applied by changes in engine throttle position. To permit this function, casing 28 has an opening to slidably receive a pushrod 37a connected in a suitable manner with an accelerator pedal 37 employed to control fuel flow to engine 20. Within casing 28 one end of pushrod 37a has an adapter 38 to receive one end of a spring 39 the other end of which engages a lever 40 pivoted as at 41 in the casing. The end 42 of the lever 40 opposite that engaged by spring 39 is arranged to engage one end of valve spool 35. The other end of this spool is formed with a head 43 for engagement by predetermined ends 44 of bell cranks 45 pivotally carried within a rotor 46 supported for rotation in the casing 28. A shaft 47 journalled in the casing carries the rotor and transmits a rotary signal thereto in a selected relation to the transmission output speed. Bell cranks 45 have weighted ends 48 which, due to centrifugal action, cause the ends 44 to tend to move valve spool 35 in a direction opposite to that caused by movement of the throttle in a fuel increasing direction. From the foregoing description, thus far given, it will be observed that when the throttle is advanced to increase fuel flow to the engine, pushrod 37a applies, through spring 39 and lever 40, a force tending to move valve spool 35 in a direction to establish communication between inlet port 30 and power cylinder port 32. When such communication is established, fluid pressure will be applied to cylinder 22 to adjust transfer roller in a direction to select a gear ratio which will increase power transmitted to the drive wheels. As the transmission output shaft speed increases a signal bearing a predetermined relation to such speed is applied to the valve spool through the rotation of the rotor 46 and the centrifugally operated bell cranks 45. This signal opposes that applied by the throttle and tends to counteract it by moving spool 35 in the opposite direction.

As the transmission output is applied to the drive wheels they apply a forward thrust to the vehicle by reaction with the supporting road surface. The position of the valve spool is modified in accordance with the drive wheel thrust by providing the vehicle with one or more sensing devices 49. These elements consist of rod-like members 50 secured at one end to the vehicle frame and connected with the drive wheels through radius rods 51 secured at one end to the members 50 and at the other end to the axle housing. The connection with the members 50 is such that the running gear may move up and down according to the road contour without transmitting motion to such members. Any thrust developed by reaction of the drive wheels on the road surface will, however, be sensed by a flexing of the members 50. This flexing is applied through a second plunger 52 and spring 53 to the lever 40 at the end 42 and on the side opposite that engaged by the valve spool. It should be noted that increasing thrust by the drive wheels acts on the valve spool in the same direction as the transmission output speed and tends to counteract movement of the spool 35 by the throttle input signal. In this manner the gear ratio is changed from "low speed" or high torque toward "high speed" or lower torque. It should be recognized that after the vehicle has been accelerated until it reaches desired cruising speed higher efficiency is secured by utilizing a comparatively lower engine rpm than during the acceleration stages.

With the control system of the invention the optimum gear ratio to secure the maximum acceleration in the shortest possible time will be automatically selected. Such action also results in highest engine efficiency.

From the foregoing it will be seen that the present invention also contemplates an improved method of controlling acceleration of a vehicle having a variable speed transmission, which comprises the steps of sensing the parameters of throttle position, transmission output speed, and drive wheel thrust, and then adjusting the speed ratio of the transmission in relation to all three of these parameters.

I claim:

1. An acceleration control system for a vehicle having an engine with a throttle, a variable speed transmission, an axle with a housing, and drive wheels comprising:
    a. power responsive means for adjusting the transmission to change the speed ratio thereof;
    b. means controlling the application of power to said power responsive means;
    c. actuating means for said power controlling means responsive to engine throttle movement, transmission output speed, and drive wheel thrust.

2. The acceleration control system of claim 1 in which the means for adjusting the transmission to change the speed ratio is responsive to fluid pressure.

3. The acceleration control system of claim 2 in which the means controlling the application of power to said fluid pressure responsive means includes a valve.

4. The acceleration control system of claim 3 in which said actuating means comprises a drive wheel thrust sensor, and an input from said engine throttle and said thrust sensor to said valve.

5. The acceleration control system of claim 4 in which the valve of the control means is moved in one direction by throttle operation to increase engine speed and in the opposite direction by an increase in transmission output speed.

6. The acceleration control system of claim 5 in which the means sensing drive wheel thrust increase tends to assist valve movement by an increase in transmission output speed.

7. The acceleration control system of claim 1 in which said actuating means includes a drive wheel thrust sensor comprising a flexible element connected with the vehicle frame and the axle housing.

8. The acceleration control system of claim 1 in which said actuating means includes a drive wheel thrust sensor comprising a torque rod connected with the vehicle frame and with the drive wheels through the axle housing.

9. The acceleration control system of claim 1 in which the means controlling the application of power to said power responsive means is actuated to decrease the output speed of the transmission when the throttle is actuated to increase engine speed.

10. The acceleration control system of claim 9 in which the drive wheel thrust sensing means tends to oppose actuation of the power control means by throttle increase as drive wheel thrust increases.

11. In combination with a vehicle having a chassis, an engine, a throttle controlling engine speed, a variable speed transmission having a speed ratio defined as the ratio of input speed to output speed, and ground engaging drive wheels; an acceleration control system comprising:

means for adjusting said transmission to change said speed ratio thereof;

first sensing means for sensing throttle position;
second sensing means for sensing said transmission output speed;
third sensing means for sensing thrust developed between said drive wheels and said chassis; and
control means for controlling said adjusting means substantially simultaneously in response to said first, second and third sensing means whereby movement of said throttle in a direction for increasing engine speed tends to increase said speed ratio, while increase in said sensed thrust tends to decrease said speed ratio, and increase in said sensed transmission output speed also tends to decrease said speed ratio.

12. In combination with a vehicle having a chassis, an engine, a throttle controlling engine speed, a variable speed transmission having a speed ratio defined as the ratio of input speed to output speed, an axle with a housing, and ground engaging drive wheels operably secured to said axle:
- a fluid power cylinder and piston unit operably coupled with said transmission for changing said speed ratio;
- a fluid pump;
- a fluid control valve shiftable in first and second opposite directions for directing pressure fluid flow from said pump to said cylinder and piston unit to respectively increase and decrease said speed ratio;
- means for sensing the position of said throttle and operably coupled with said valve to urge the latter to shift in said first direction upon movement of said throttle to increase engine speed;
- means for sensing said output speed of the transmission and operably coupled with said valve to urge the latter to shift in said second direction as said output speed increases; and
- drive wheel thrust sensing means comprising a member secured in cantilevered, flexible relationship to said chassis and operably secured to said axle housing whereby said member flexes in response to thrust developed between said drive wheels and said chassis, said member disposed for operably engaging said valve to urge the latter to shift in said second direction as said secured thrust increases.

13. A method for controlling acceleration of a vehicle having an engine, a throttle controlling engine speed, a variable speed transmission having a speed ratio defined as the ratio of input speed to output speed, and ground engaging drive wheels, comprising the steps of:
- sensing throttle position, transmission output speed, and drive wheel thrust; and
- adjusting the speed ratio in relation to the sensed throttle piston, transmission output speed and drive wheel thrust.

* * * * *